Jan. 27, 1931.  H. H. HARDINGE  1,790,471
LAWN MOWER GRINDER
Filed Aug. 15, 1928  5 Sheets-Sheet 1

Inventor:
Henry H. Hardinge
By: [signature] Atty.

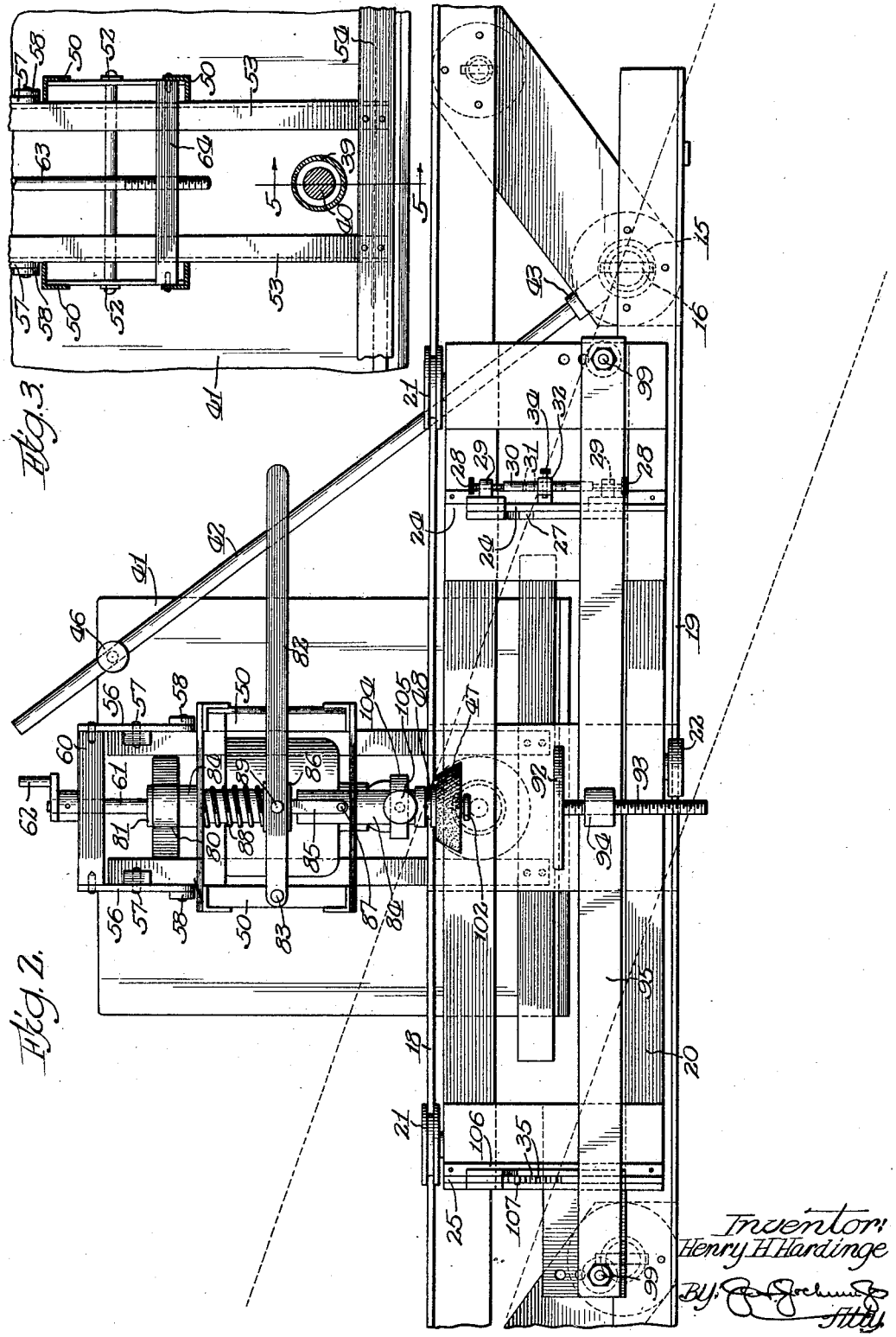

Jan. 27, 1931.  H. H. HARDINGE  1,790,471
LAWN MOWER GRINDER
Filed Aug. 15, 1928    5 Sheets-Sheet 3
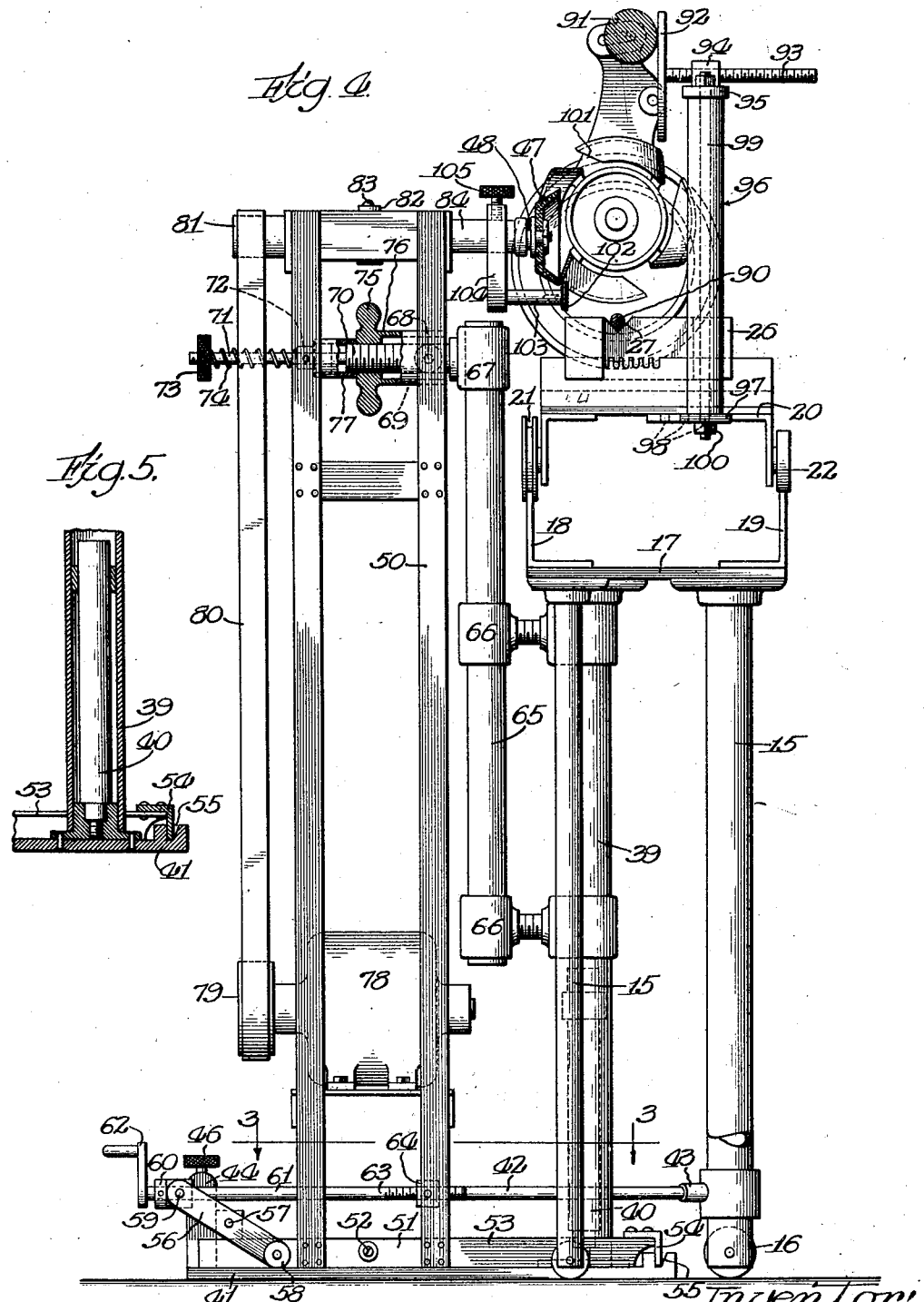

Jan. 27, 1931. H. H. HARDINGE 1,790,471
LAWN MOWER GRINDER
Filed Aug. 15, 1928 5 Sheets-Sheet 4
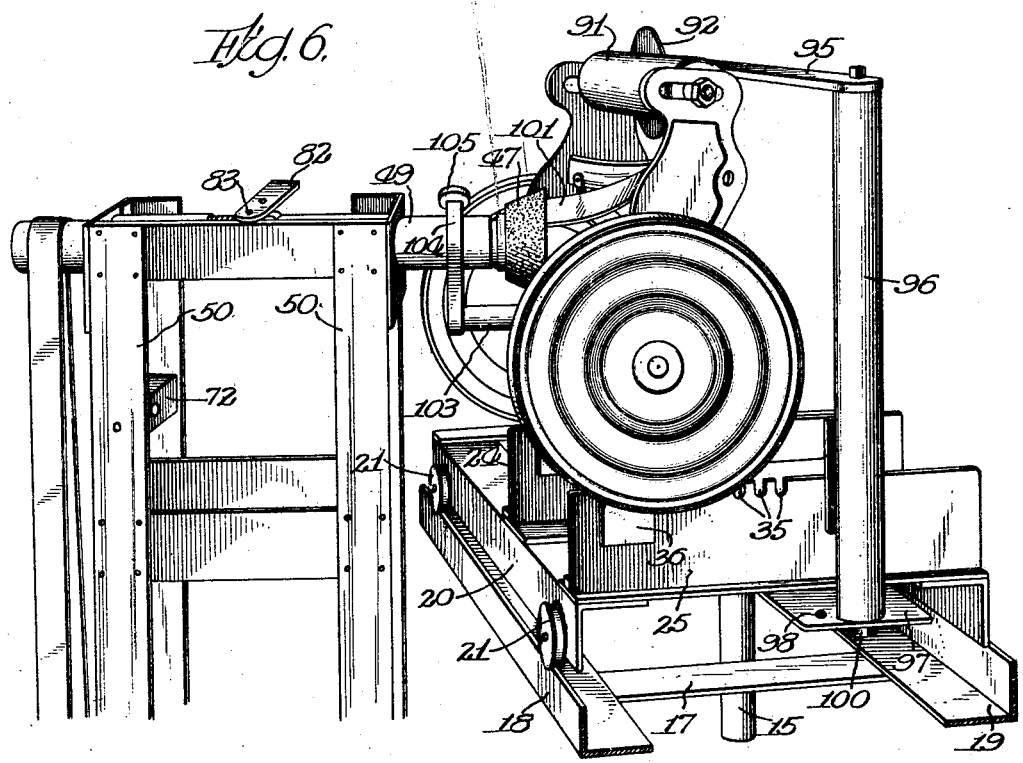
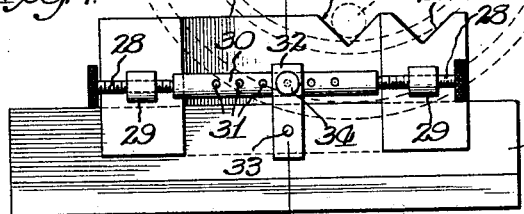
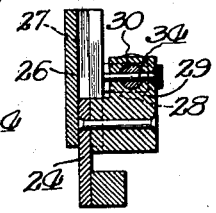
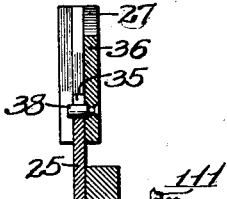
Inventor:
Henry H. Hardinge

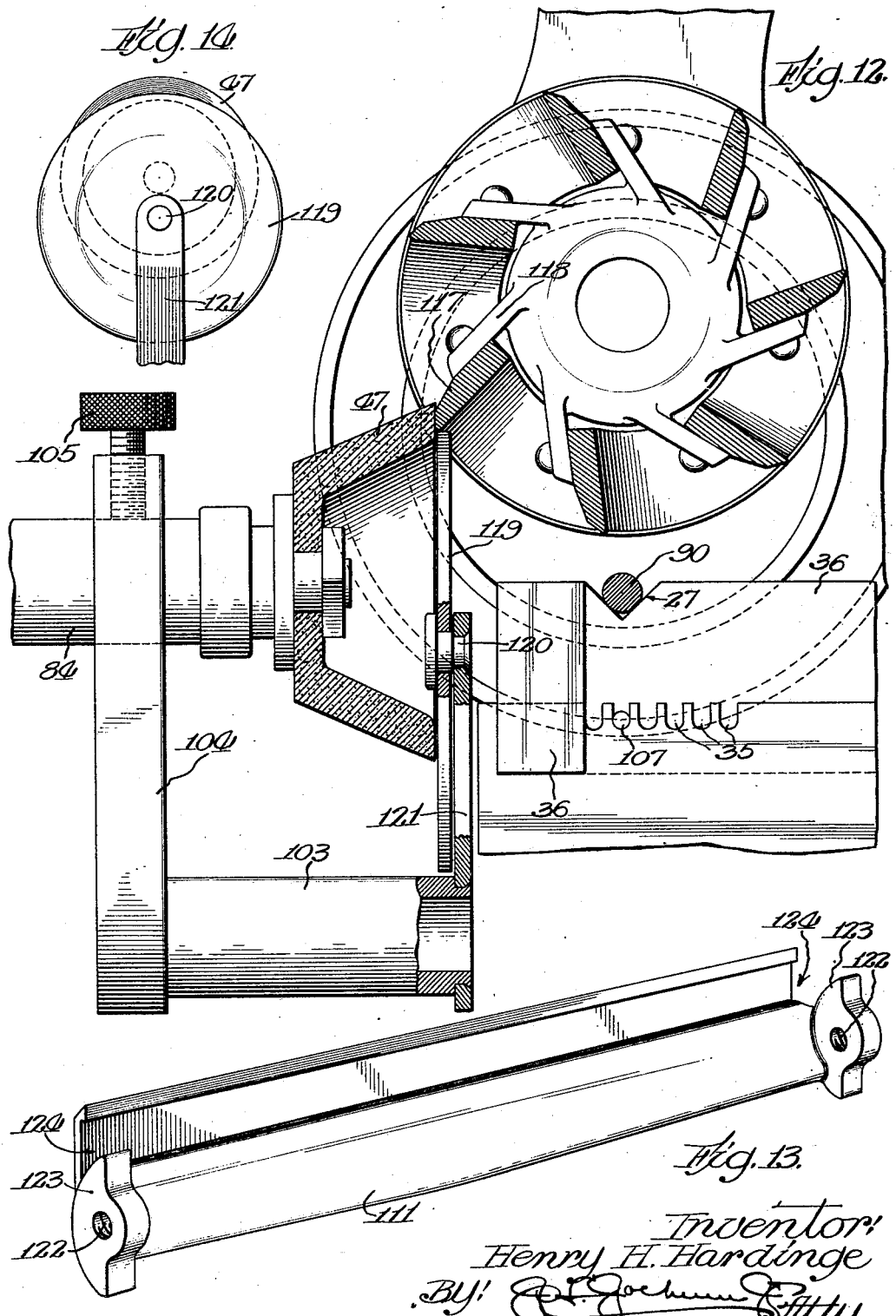

Patented Jan. 27, 1931

1,790,471

UNITED STATES PATENT OFFICE

HENRY H. HARDINGE, OF CHICAGO, ILLINOIS, ASSIGNOR TO SARAH JANE HARDINGE, OF CHICAGO, ILLINOIS

LAWN-MOWER GRINDER

Application filed August 15, 1928. Serial No. 299,678.

This invention relates to improvements in lawn mower grinder, and one of the objects of the same is to provide a machine of this character which will be of a simple and compact arrangement; which may be successfully operated without the services of an expert, and by means of which machine the spiral as well as the stationary blade or knife may be ground or sharpened, and with the further result that the spiral blades will have a close fit and a proper clearance with respect to the stationary blade or knife, the reel blades being ground or sharpened without detaching therefrom the mower.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a front elevation of a machine of this character constructed in accordance with the principles of this invention.

Figure 2 is a top plan view of Figure 1.

Figure 3 is a detail horizontal sectional view taken on line 3—3, Figure 4.

Figure 4 is a view taken from the left hand end of Figure 2 with parts in section and with parts broken away for the sake of clearness.

Figure 5 is a view as taken on line 5—5, Figure 3, partly in elevation, partly in vertical section and partly broken away.

Figure 6 is a detail perspective view of the upper portion of the machine showing the lawn mower in position with respect thereto.

Figure 7 is a detail view in side elevation of one of the supporting members for the mower.

Figure 8 is a view similar to Figure 9 of the supporting member which co-operates with the supporting member shown in Figure 7 and having attached thereto a support for the stationary blade.

Figure 9 is a detail sectional view taken on line 9—9, Figure 7.

Figure 10 is a detail sectional view taken on line 10—10, Figure 8.

Figure 11 is a detail view partly in elevation and partly in section of the companion member to the member shown in Figure 8.

Figure 12 is an enlarged detail view partly in elevation and partly in vertical section illustrating the manner of using this sharpening device for what is known as "putting green" mowers.

Figure 13 is a detail perspective view of a ground plate or blade of the mower.

Figure 14 is an elevation taken from the front of the grinding wheel and showing the work supporting wheel in connection therewith.

Figure 1:
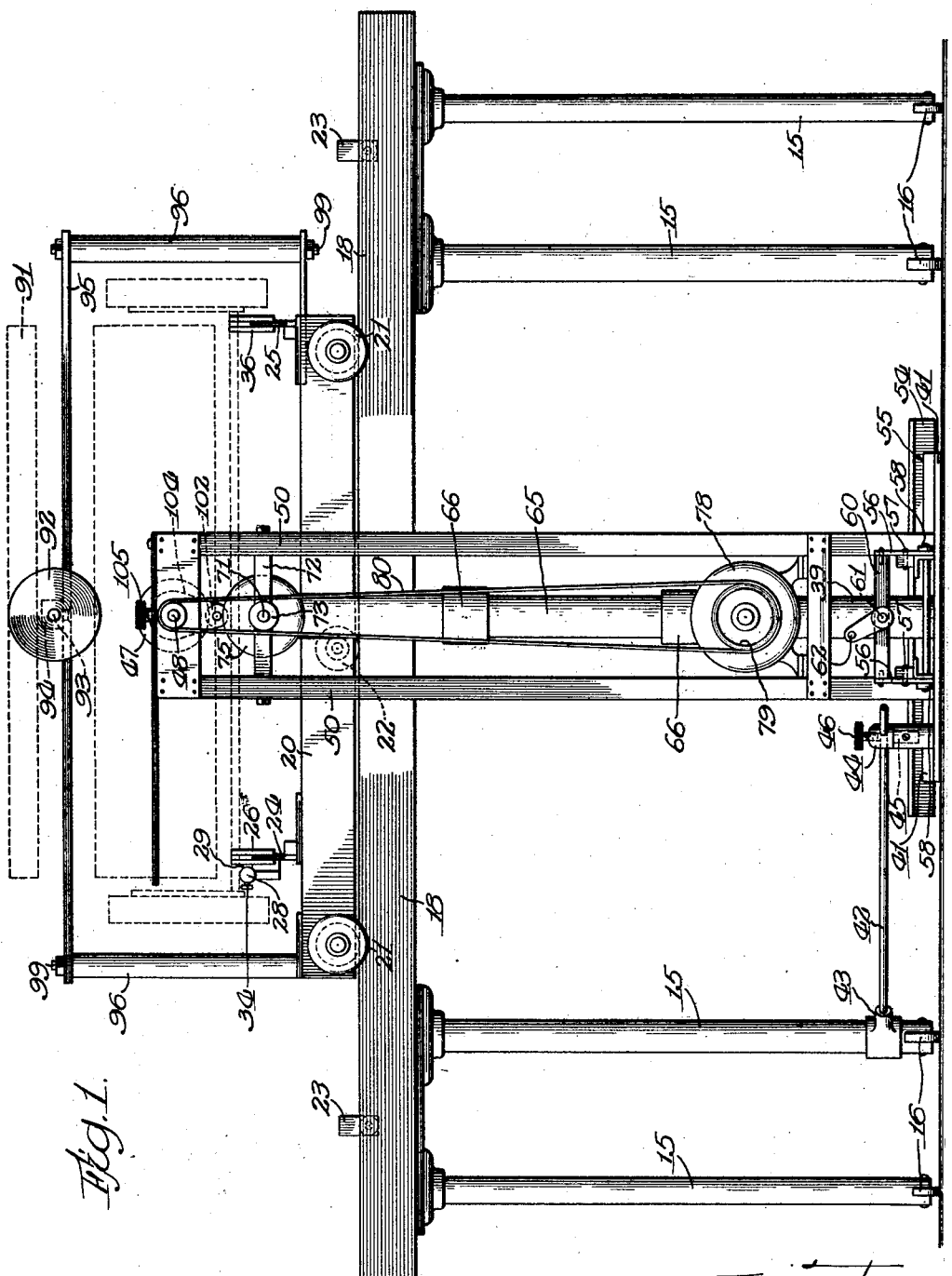

Referring more particularly to the drawings the numerals 15 designate uprights of any desired size and configuration which are mounted upon rollers or casters 16 that rest upon the ground or floor, and carried by these uprights is a support 17 and upon this support is arranged parallel tracks or guides 18—19. The support 17 with the guides 18—19 may be of any desired length and mounted to travel thereupon is a carriage 20, having peripherally grooved rollers 21 which engage and roll upon the track or guide 18 and flat rollers 22 which engage and roll upon the guide or track 19. By means of the provision of the grooved rollers 21 it will be manifest that the carriage will be held in proper position with relation to the tracks or guides and will be prevented from being laterally displaced, stops 23 being arranged at suitable points upon the track or guide 18 for limiting the traveling movement of the carriage.

Secured to this carriage and extending transversely thereacross are uprights 24—25 which are preferably formed of material of comparatively small gauge and are spaced from each other for any suitable distance.

Removably mounted upon the member 24 is a support 26 provided with a notch or seat 27 preferably of a V shaped configuration. This support 26 is provided with spaced depending portions which are adapted to stand astride of the upper edge of the upright 24 so as to move longitudinally thereupon.

Thumb screws 28 are provided and are threaded through spaced portions 29 carried by the support 26 so as to engage the ends of the rod 30, which latter is provided with a plurality of recesses 31. The rod 30 is supported by and moves through a bearing 32 that is secured to the upright 24 as at 33.

With this construction it will be manifest that when the screws 28 are respectively adjusted, and when the rod 30 is maintained stationary, the support 26 will be bodily moved with respect to the upright 24.

Projecting through the bearing 32 is a screw or fastening element 34 which is adapted to engage in the recesses 31. By retracting the screw or fastening element 34 and adjusting the support 26 upon the upright 24, the rod 30, being held in position by means of the screws 28, will freely move through the bearing 32 until one of the recesses 31 is positioned adjacent the end of the screw or fastening element 34. This will permit of a general adjustment of the support 26. When the latter is in position and the fastening element 34 seated in one of the recesses 31, a further adjustment of the support 26 with respect to the upright 24 may be obtained by a proper adjustment of the screws 28.

The upright 25 is provided with a series of recesses 35 opening through the upper edge thereof and mounted so as to slide upon the upright 25 is a support 36 having a recess 37 opening through the upper edge thereof, which co-operates with the bearing 27 in the support 26. Carried by the support 36 is a projection or pin 38 that is adapted to enter the grooves or notches 35 in the upright 25 so that the support 36 may be adjusted lengthwise of the upright 25 by disengaging the pin or projection 38 from the notches or recesses 35 and when the support 36 is positioned the pin or projection 38 will enter one of the notches or recesses 35 to hold the support 36 against adjustment with respect to the upright 25.

Depending from the support 17 is a tubular member 39, the lower end of which receives a pin or projection 40 mounted upon a base plate or member 41 that rests upon the ground or floor, so that the uprights 15 and the structure superposed thereupon will be adapted for movement upon the ground or floor at the will of the operator, and for the purpose of positioning the mower with respect to the sharpening element, to be described, at the will of the operator.

In order to maintain these parts in their adjusted position there may be provided a bar or rod 42 which is connected as at 43 with one of the uprights 15 at one end, the other end of the bar passing loosely through a bearing 44 which is swiveled as at 45 in a suitable bearing carried by the member 41. A fastening screw 46 is adapted to engage the rod 42 where it passes through the bearing 44 for locking the parts in their adjusted position. Thus by loosening the screw 46 the carriage and the structure which supports the carriage may be moved into any desired position with respect to the base plate 41. After the desired adjustment has been obtained the screw 46 may be tightened for maintaining the carriage in the position desired.

A sharpening element 47, preferably in the form of a hollow frustro-conical member is secured to a shaft 48 and is journaled in a sleeve or bearing 49 that is carried by a frame 50. The frame preferably embodies uprights that are connected together at their lower extremities by means of members 51 and the frame is pivotally supported by means of pivots 52 passing through the members 51 and engaging a plate or member 53 which rests upon the base plate 41, so that the frame may rock about the pivot 52 when desired. The member 53 is provided with a depending flange 54 that enters a socket or recess 55 in the base plate 41 so as to form a fulcrum or pivot for the member 53 and the frame 50 to be rocked upon.

It is sometimes necessary to raise and lower the sharpening element 47 and in order to accomplish this movement the member 53 is rocked with respect to the base plate 41, and in order to maintain the frame 50 and the sharpening element 47 in a proper upright position when the member 53 is rocked, the pivots 52 between the frames 50 and the member 53 is provided. The member 53 is rocked about the fulcrum 54—55 in any suitable manner, but preferably by means of levers 56 pivotally supported intermediate their ends as at 57. Connected with one end of the levers are rollers 58 which are adapted to engage the floor and pivotally connected to the other end of the levers as at 59 is a bearing 60, in which one end of a shaft 61 is journaled. Connected to the shaft 61 is a crank handle 62 and the other end of the shaft 61 is threaded as at 63 to engage a bearing 64 which is pivotally connected to the frame 50. Thus, when the crank 62 is operated the shaft 61 will be threaded into or out of the bearing 64, according to the direction of rotation of the shaft to cause the rollers 58 on the ends of the levers 56 to move into or out of engagement with the floor or ground or the base plate 41, with the result that the member 53 will be rocked about the fulcrum 54—55 to raise or lower the frame and with it the grinding or sharpening element 47.

Any suitable means may be provided for rocking the element 50 about its pivot 52, but a simple and efficient means embodies an upright 65 which may be supported in any suitable manner, preferably by means of brackets 66 connected with the depending tubular member 39. This upright 65 extends to a point in proximity to the sharpening element 47 and has loosely mounted thereupon a collar 67.

Pivotally connected with the collar as at 68 is a rod 69 having a threaded portion 70 and a reduced portion 71. The rod passes through the frame 50 and the reduced portion 71 passes through a cross bar 72 on the frame. Threaded upon the end of the reduced portion 71 is a nut 73 and interposed between the nut 73 and the cross bar 72 and encompassing the reduced portion 71, is a spring 74 which tends normally to move the frame 50 to the right in Figure 4 so as to hold the grinding element 47 against the blade being sharpened.

Threaded upon the portion 70 of the rod 69 is a hand wheel 75 which is provided with a sleeve 76 extending over a portion of the rod to protect the same. A sleeve or collar 77 is interposed between the element 75 and the cross bar 72 and against which the hand wheel 75 operates.

It will be manifest by operating the hand wheel 75 the tension of the spring 74 may be varied and as the rod 69 is pivotally connected as at 68 with the collar 67, and inasmuch as the upright 65 remains stationary, when the frame 50 is rocked about its pivot 52, the pivot 68 will permit of this movement of the frame and will not interfere with the adjustment of the frame.

Mounted also upon the frame 50 is a motor 78 of any desired type, preferably of the electric type, and connected to the shaft of the motor is a pulley 79 over which a drive belt 80 passes, and the drive belt also passes over a pulley 81 on the shaft 48 to which the grinding element 47 is connected so that the grinding element and the power mechanism for actuating the same in connection with the frame 50, constitutes a single unit.

The grinding element 47 is adapted to be moved toward and away from the work and with respect to the frame 50 in any suitable manner, such as by means of a lever 82 which is pivotally mounted as at 83 upon the frame 50. Mounted upon the shaft 82 is a sleeve 84 and arms 85 connected with a collar 86 are adapted to move the shaft 48 and the grinding element 47 toward and away from the work. This is accomplished by means of pins or projections 87 which pass through suitable slots in the sleeve 84 and engage in a grooved collar on the shaft 48 so that the shaft may be longitudinally reciprocated while the rotation thereof will not be interfered with.

A spring 88 is interposed between a portion of the frame 50 and the collar 86 and tends normally to move the collar 86 in one direction. Connected with the lever 82 are pins 89 which enter a peripheral groove in the collar 86 so that when the lever 82 is rocked about its pivot, the collar 86 will be moved but the rotation thereof will not be interfered with.

When it is desired to sharpen the spiral blades of the mower, the stationary blade is removed from the mower and the mower is inserted bodily into the machine, so that the cross bar 90 thereof will rest in the bearings 27—37 of the supports 26—36, these supports being adjusted to the approximate proper position before the mower is placed in the machine. The ground engaging roller 91 of the mower will then rest against a stop device 92 which may be of any desired configuration, but preferably embodies a head 92 on a threaded shaft 93, which latter passes through a bearing 94 carried by a supporting member 95.

The supporting member 95 is connected to the carriage by means of uprights 96 preferably of tubular construction, and which uprights rest upon a plate or ledge 97 on the carriage. This plate 97 is provided with a plurality of apertures 98 therethrough and a rod or bar 99 passes through the member 95, tubular members 96, and plate or member 97 through one of the apertures 98 thereof, and the rod is held in position by means of a nut or collar 100 threaded on to the extremity thereof.

By adjusting the threaded member 93 in its bearing 94 the position of the stop or rest 92 may be varied so as to determine the angle at which the mower may be placed and held within the machine. At the same time the uprights 96 may be bodily adjusted by means of the apertures 98 in the member 97.

After the mower has been thus positioned and in the event it is desired to secure a micrometer adjustment, the thumb screws 28 (see particularly Figure 7) are adjusted for that purpose.

When the mower is in the position shown in Figure 4, the edge of the grinding element 47 will engage the edge of the spiral blades 101 of the mower and the spring 74 will hold the grinding element yieldingly in engagement with the spiral blades.

A suitable support may be provided for holding the spiral blades in position during the operation of the grinding element, such as a roller 102 mounted for free rotation upon a shaft 103, which in turn is mounted upon a support 104 connected to and depending from the sleeve 84, preferably by the sleeve passing through the support 104 and a thumb screw 105 is provided for holding the roller 102 in position. In this position and as shown in Figure 4, the spiral blade will be supported and be properly held during the grinding operation.

When desired and in order to get the supporting roller 102 out of the way, the thumb nut 105 may be loosened and the support 104 swung about the sleeve 84 to position the roller 102 above the grinding element 47.

Thus it will be seen that there will be provided a compact and simple construction whereby the proper sharpening of the spiral blades will be insured. As the grinding element 47 progresses from one end of the plate to the other, the spiral blades may be bodily rotated.

With this improved machine it will also be possible to sharpen the blades from both ends thereof, that is to say after the work carriage has traveled the length of the blade in one direction, it may be caused to be moved backwardly in the opposite direction. On either bodily movement of the work carriage and if desired in order to prevent the spiral blades from rotating a slight pressure may be exerted upon the blades by the hand of the operator.

In Figures 8 and 11 there is shown a modified form of support for holding the stationary blade in position to be ground. In order to grind the stationary blade it is removed from the mower and a support 106 is provided which is similar to the support 36 and is interchanged with the support 36, a pin 107 on the support 106 entering the grooves or recesses 35 in the upright 25. Connected with the support 106 is an upright 108 having slots 109—110 arranged at angles to each other so as to support the stationary blade 111 in either the full line or dotted line position shown in Figure 8, to be engaged by the grinding element 47.

In order to prevent the support 106 from becoming detached from the upright 25 thumb nuts 112 may be provided.

The companion support 113 which cooperates with the support 106 is similar to the support 26, with the exception that in lieu of the bearing 27 an upright 114, similar to the upright 108 is provided, and this upright 114 is provided with grooves 115 similar to the grooves 109—110, for holding the stationary blade in one of two positions.

The support 113 is adapted to engage over the edge of the upright 24 and held against displacement by means of thumb nuts 116. After the supports 113—106 have been adjusted and the stationary blade 111 secured thereto, a micrometer adjustment may be secured by adjusting the support 113 in the same manner that the support 26 is adjusted by means of the bar or rod 30 and the thumb screws 28.

With this improved construction it will be manifest that as the carriage 20 carrying the work is reciprocated upon the tracks or guides 18—19 and with respect to the grinding element 47, the carriage will be guided in a straight line due to the fact that the grooved roller 21 receiving the edge of the track or guide 18 will hold the same against lateral displacement.

The spiral blades will be held in position by means of the supporting roller 102 and the grinding element will engage the blades at the proper angle.

The grinding element 47 will be yieldingly held against the edge of the plate by means of the spring 74, the tension of which may be varied.

The carriage and the supporting structure therefor is adapted for a free pivotal movement with respect to the base 41 about the pivot 40, and the frame 50 with the supporting structure is adapted to be raised and lowered with respect to the base plate 41. This will cause the supporting plate or member 53 to rock about the fulcrum 54 and during this rocking movement and as the frame 50 is bodily raised it may be swung about its pivot 52 so as to properly position the grinding element 47 with respect to the work.

With this construction it will also be manifest that the edge of the sharpening element 47 will always be parallel with the edge of the blade of both the reel and the stationary blade.

Furthermore, the frame 50 which carries the motor and the sharpening element is adapted for both a vertical and a pivotal adjustment to enable the operator to provide a proper clearance on the reel blade and a proper position with relation to the lower edge of the grinding wheel.

In Figure 12 of the drawings the device is illustrated as being used in connection with the type of mower known as "putting green" mowers, in which the mower is held in a position that the upper edge of the knives 117 will be engaged and sharpened by the upper edge of the grinding wheel 47 or the portion of the grinding wheel which is above the axis of rotation of the grinding wheel so that the grinding wheel can grind ample clearance upon the reel without touching the spiders 118 which support the blades 117 in position and without interfering with the next blade. This is particularly advantageous as in "putting green" mowers the blades 117 are arranged very close together. In this form of the invention a disc 119 is rotatably supported as at 120 by an arm or bracket 121 which is secured to the shaft 103 that is carried by the support 104.

The disc 119 is of a diameter considerably greater than the diameter of the adjacent face of the grinding wheel 47 so as to support the work up to the end of the work, as shown more clearly in Figure 14.

In using this invention for sharpening the stationary or ground blade 111, the latter is secured to the upright 108 by means of a screw 108ª that enters the same hole 122 in the ears 123 of the ground plate and which hole serves as the means by which the ground plate is secured to the mower, thereby dispensing with the necessity of using clamps as has heretofore been done in machines of this general character.

In ground plates of this character there is a clearance 124 between the ears 123 at the ends of the ground plate and the cutting edge of the ground plate. When the ground plate or blade is to be sharpened it will be held in the position shown in Figure 8, so that the lower edge of the grinding wheel, below the axis of rotation of the grinding wheel will engage the edge of the ground blade as shown in Figure 8, to sharpen the latter. In this position it will be manifest that the grinding wheel 47 will engage the ground plate to the end of the plate and by reason of the clearance 124 and the position and shape of the grinding wheel 47, the latter will pass through the clearance space 124 without interfering with or being obstructed in its movement by the ears 123.

While the preferred forms of the invention have been herein shown and described, it is to be understood that various changes may be made in the details of construction and in the combination and arrangement of the several parts, within the scope of the claims, without departing from the spirit of this invention.

What is claimed as new is:—

1. In combination, a base, a lawn mower support mounted for pivotal movement with respect to the base and on an upright pivot, a sharpening element mounted for bodily vertical movement with respect to said base and said support and also for pivotal movement toward and away from the lawn mower support on a horizontal axis, and means for effecting such movements of the said element.

2. In combination, a base, a lawn mower support mounted for pivotal movement with respect to the base on an upright pivot, a sharpening element supporting structure mounted for bodily vertical movement with respect to the base and the first said support and also for pivotal movement towards and away from the latter on a horizontal pivot, a sharpening element, means for actuating the latter, the said element and its operating means being mounted upon the second recited support, and means for effecting the said movements of the latter.

3. In combination, a base, a lawn mower support mounted for pivotal movement with respect to the base and on an upright pivot, a sharpening element mounted for bodily vertical movement with respect to said base and said support and also for pivotal movement toward and away from the lawn mower support on a horizontal axis, means for effecting such movements of the said element, and means for retracting the sharpening element with respect to the lawn mower support.

4. In combination, a base, a lawn mower support mounted for pivotal movement with respect to the base and on an upright pivot, a sharpening element mounted for bodily vertical movement with respect to said base and said support and also for pivotal movement toward and away from the lawn mower support on a horizontal axis, means for effecting such movements of the said element, means tending normally to move the said element supporting structure about its pivot in a direction towards the mower support, and means for retracting at will the sharpening element.

5. In combination, a base, a lawn mower support mounted for pivotal movement with respect to the base and on an upright pivot, a sharpening element mounted for bodily movement with respect to said base and said support and also for pivotal movement toward and away from the lawn mower support on a horizontal axis, means for effecting such movements of the said element resilient means tending normally to move the said element supporting structure about its pivot in a direction towards the support, and means for varying at will the stress of the said resilient means.

6. In combination, a lawn mower support a sharpening element mounted for bodily vertical movement with respect to the first recited support and also for pivotal movement towards and away from the mower support on a horizontal pivot, means for effecting such movements, a rotatable sharpening element, and a motor for actuating the element, both supported by the second recited support and bodily movable therewith.

7. In combination, a lawn mower support, a sharpening element support mounted for vertical movement with respect to the first recited support and also for pivotal movement towards and away from the mower support on a horizontal pivot, means for effecting such movements, a rotatable sharpening element, a motor for actuating the element, both supported by the second recited support and bodily movable therewith, and means for retracting the said sharpening element at will and with respect to the second recited support.

8. In combination, a supporting structure, a carriage for receiving and holding a lawn mower and adapted to traverse said structure, a sharpening element supporting structure mounted for bodily vertical movement with respect to the first said structure and also for pivotal movement towards and away from the latter on a horizontal pivot, a sharpening element and actuating means therefor, both mounted upon the second recited structure, and means for effecting the said movements of the later.

9. In combination, a base, a support connected with the base for movement on an upright pivot, a lawn mower carriage mounted for free traveling movement back and forth upon said support, a sharpening element supporting structure mounted for bodily vertical movement with respect to said base and the first said support and also for pivotal movement toward and away from the first said support on a horizontal pivot, means for effecting such movements of the sharpening element support, a sharpening element, and means for actuating the latter, both mounted upon and movable with the sharpening element support.

10. In a lawn mower grinder, the combination of a swinging support, a grinding wheel rotatably supported thereby, a roller carried by said support adapted to engage with the under surface of the spiral reel knives of a lawn mower, means for rotating said grinding wheel, means mounting said roller for bodily adjustment whereby it may be moved out of the way so as not to interfere with the positioning of another blade of the mower to be sharpened, and means for retracting at will the said grinding wheel with respect to the said swinging support.

11. In combination, a lawn mower supporting carriage, guides upon which the carriage moves, a swinging support separate from the carriage, a grinding wheel rotatably supported thereby, means for rotating the grinding wheel, said grinding wheel being fixed while the said carriage is reciprocable upon its guides, and means yieldingly holding the grinding wheel in contact with the work.

12. In combination, a lawn mower supporting carriage, guides upon which the carriage moves, a swinging support separate from the carriage, a grinding wheel rotatably supported thereby, means for rotating the grinding wheel, said grinding wheel being fixed while the said carriage is reciprocable upon its guides, means yieldingly holding the grinding wheel in contact with the work, a roller carried with said swinging support adapted to engage with the under surface of the spiral reel knives of a lawn mower, and means adapting said roller to be moved out of the way with respect to the grinding wheel so as not to interfere with the positioning of another blade of the mower to be sharpened.

13. In combination, a lawn mower supporting carriage, guides upon which the carriage moves, a swinging support separate from the carriage, a grinding wheel rotatably supported thereby, means for rotating the grinding wheel, said grinding wheel being fixed while the said carriage is reciprocable upon its guides, and an adjustable rest carried with the carriage and against which a portion of the mower has engagement for positioning the mower upon the carriage and for accommodating different sizes of mowers.

14. In a lawn mower grinder, the combination of a traveling mower supporting carriage, guides for the carriage, rollers connected with the carriage and engaging the guides, certain of said rollers and the co-operating guide being provided one with a groove and the other extending into the groove to insure a straight travel of the carriage, a swinging support, a grinding wheel rotatably supported thereby, a roller carried by said support adapted to engage with the under side of the spiral knives of a lawn mower, and means for rotating the grinding wheel.

15. In a lawn mower grinder, the combination of a swinging support, a hollow grinding wheel rotatably supported thereby, means co-operating with said grinding wheel and adapted to engage with the under surface of the particular spiral reel knife of a lawn mower which is being operated upon by the grinding wheel, and means for rotating the grinding wheel.

16. In a lawn mower grinding machine spaced uprights, one of said uprights having seats opening through the top thereof, supporting members engaging over the top edges of the uprights, a formation on one of said elements adapted to enter said openings, bearings carried by said members, means securing the other of said members against relative movement with respect to its upright, and means for imparting a further adjustment to the last said member when secured by the last said means.

17. In a lawn mower grinding machine spaced supports, work holding members engaging over the top of said uprights, means for securing each of said work holding members for predetermined adjustments with relation to their respective supports, and means in addition to the last recited means for imparting a further adjustment to one of the said work holding members with relation to its support when its respective first said means is active.

18. In a lawn mower grinding machine spaced supports, work holding members engaging over the top of said uprights, means for securing each of said work holding members for predetermined adjustments with relation to their respective supports, means in addition to the last recited means for imparting a further adjustment to one of the said work holding members with relation to its support when its respective first said means is active, the said additional means embodying spaced bearings carried by the work holder, an element intermediate said bearings, screws threaded through said bearings and engaging the ends of said intermediate element, and means adjustably securing said intermediate element to its respective support.

19. In a lawn mower grinder, a hollow grinding wheel mounted for rotation on a horizontal axis, and means mounting the wheel with its open side adjacent the work and in a position that the edge of the grinding wheel above the axis of the wheel will operate upon the rotary blade of a lawn mower cutter reel.

20. In a lawn mower grinder, a hollow grinding wheel mounted for rotation on a horizontal axis, means mounting the wheel with its open side adjacent the work and in a position that the edge of the grinding wheel above the axis of the wheel will operate upon the rotary blade of a lawn mower cutter reel, and a supporting element adjacent the open face of the wheel and engaging the lower edge of the work.

In testimony whereof I have signed my name to this specification on this 18th day of July, A. D. 1928.

HENRY H. HARDINGE.